(12) United States Patent
Wamboldt et al.

(10) Patent No.: US 12,345,851 B2
(45) Date of Patent: Jul. 1, 2025

(54) CORROSION-RESISTANT COATINGS FOR IR-TRANSMITTING SUBSTRATES

(71) Applicant: CORNING INCORPORATED, Corning, NY (US)

(72) Inventors: Leonard Gerard Wamboldt, Sunderland, MA (US); Yongli Xu, Bolton, MA (US)

(73) Assignee: Corning Incorporated, Corning, NY (US)

( * ) Notice: Subject to any disclaimer, the term of this patent is extended or adjusted under 35 U.S.C. 154(b) by 771 days.

(21) Appl. No.: 17/581,008

(22) Filed: Jan. 21, 2022

(65) Prior Publication Data

US 2022/0236455 A1 Jul. 28, 2022

Related U.S. Application Data

(60) Provisional application No. 63/142,215, filed on Jan. 27, 2021.

(51) Int. Cl.
*G02B 1/115* (2015.01)

(52) U.S. Cl.
CPC .................... *G02B 1/115* (2013.01)

(58) Field of Classification Search
CPC ...................................... G02B 1/115
USPC .......................................... 428/629
See application file for complete search history.

(56) References Cited

U.S. PATENT DOCUMENTS

| 5,019,458 | A | 5/1991 | Elgat et al. |
| 5,173,443 | A | 12/1992 | Biricik et al. |
| 5,818,631 | A | 10/1998 | Askinazi et al. |
| 6,038,065 | A | 3/2000 | Borden |
| 9,488,760 | B2 | 11/2016 | Ballou et al. |
| 9,971,073 | B2 | 5/2018 | Crifasi et al. |
| 9,995,860 | B2 | 6/2018 | Ballou et al. |
| 10,605,966 | B2 | 3/2020 | Crifasi et al. |
| 10,761,247 | B2 | 9/2020 | Ballou et al. |
| 10,807,908 | B2 | 10/2020 | Yamaguchi et al. |
| 10,816,702 | B2 | 10/2020 | Sutherland et al. |
| 2010/0020426 | A1* | 1/2010 | Mitchell ................. C23C 14/00 359/885 |

\* cited by examiner

*Primary Examiner* — Katherine A Christy
(74) *Attorney, Agent, or Firm* — Kevin L. Bray

(57) ABSTRACT

An optical element can include a substrate comprising a Group VIA or fluoride-based non-oxide material and an adhesion layer disposed directly on the substrate. An anti-reflective coating stack is disposed directly on the adhesion layer. Methods for forming an optical element are also provided. The density and stress of the adhesion layer and layers of the anti-reflective coating stack are controlled to provide corrosion-resistant coatings on Group VIA or fluoride-based non-oxide substrates. Preferred substrate materials are materials that exhibit high transparency in the infrared.

19 Claims, 10 Drawing Sheets

(C)

(B)

(A)

CORROSION-RESISTANT COATINGS FOR IR-TRANSMITTING SUBSTRATES

This application claims the benefit of priority to U.S. Provisional Patent Application Ser. No. 63/142,215 filed on Jan. 27, 2021, the content of which is relied upon and incorporated herein by reference in its entirety.

FIELD

The present disclosure generally relates to anti-reflective coatings for optical elements and methods of making, and more specifically to anti-reflective coatings for use with Group VIA or fluoride-based non-oxide substrates that are stable in corrosive environments.

BACKGROUND

The lenses and windows used in many types of optical instruments, telescopes, cameras, airborne detectors, satellite cameras, surveillance cameras, and missile domes typically include optical coatings designed to satisfy optical specifications based on the application. Depending on the application, these optical coatings may experience harsh environmental conditions, including corrosive conditions, temperature extremes, humidity, abrasion, microbial fouling, marine environments, etc. Thus, in some applications, the optical coatings must be able to satisfy the desired optical specifications, such as transmittance, anti-reflectance, etc., while also having sufficient durability to withstand the harsh environmental conditions to which the optical coatings are exposed during use. One test for assessing durability in corrosive conditions includes exposing the coated lens/window to a salt fog test with an $SO_2$ gas flow for 7 days. Coatings that are not physically degraded after 7 days and which still satisfy optical specifications are considered to have passed this durability test. While optical coatings, such as anti-reflective coatings, capable of passing the salt fog test when disposed on traditional oxide based substrates, such as glass, are known, it can be challenging to provide optical coatings on other types of non-oxide substrates that are durable in harsh environmental conditions.

In view of these considerations, there is a need for optical coatings, such as an anti-reflective coating, for use with substrates made from a Group VIA or fluoride-based non-oxide material that satisfy optical specifications and are durable in corrosive conditions.

SUMMARY

According to a first aspect of the present disclosure, an optical element includes a substrate containing a Group VIA or fluoride-based non-oxide material and an adhesion layer disposed directly on the substrate, the adhesion layer containing silicon and less than 1.0 at % oxygen. An anti-reflective coating stack is disposed directly on the adhesion layer and contains a first additional layer and a second additional layer, the first additional layer comprising $SiO_x$, where $1 \leq x \leq 2$, and the second additional layer containing silicon and an oxygen content of less than 1.0 at %.

According to a second aspect of the present disclosure, an optical element includes a substrate containing a Group VIA or fluoride-based non-oxide material and an adhesion layer disposed directly on the substrate, the adhesion layer containing silicon and less than 1.0 at % oxygen. An anti-reflective coating stack is disposed directly on the adhesion layer, wherein the anti-reflective coating stack passes an $SO_2$-modified Salt Spray Test for at least 24 hours, as measured according to ASTM G85-11, Annex A4.

According to a third aspect of the present disclosure, an optical element includes a substrate containing a Group VIA or fluoride-based non-oxide material and an adhesion layer disposed directly on the substrate. An anti-reflective coating stack is disposed directly on the adhesion layer and contains a first additional layer and a second additional layer, the first additional layer containing $SiO_x$, where $1 \leq x \leq 2$, and the second additional layer containing silicon and an oxygen content of less than 1.0 at %. The anti-reflective coating stack passes an $SO_2$-modified Salt Spray Test for at least 24 hours, as measured according to ASTM G85-11, Annex A4.

According to a fourth aspect of the present disclosure, an optical element includes a substrate containing a Group VIA or fluoride-based non-oxide material and an adhesion layer disposed on the substrate. An anti-reflective coating stack is disposed on the adhesion layer, wherein the anti-reflective coating stack has a reflectance of 1.0% or less, as measured at at least one wavelength between 1.0 μm to 8.0 μm. The anti-reflective coating stack passes an $SO_2$-modified Salt Spray Test for at least 24 hours, as measured according to ASTM G85-11, Annex A4.

According to a fifth aspect of the present disclosure, a method of forming an optical element is provided. The method includes providing a substrate containing a Group VIA or fluoride non-oxide material. The method also includes ion bombarding a first surface of the substrate for at least 3 minutes, wherein a power applied to the ion source is at least 100 Watts. An adhesion layer is deposited directly on the first surface, wherein the adhesion layer contains silicon and less than 1.0 at % oxygen. An anti-reflective coating stack is deposited directly on the adhesion layer.

These and other aspects, objects, and features of the present disclosure will be understood and appreciated by those skilled in the art upon studying the following specification, claims, and appended drawings.

Figure 7:
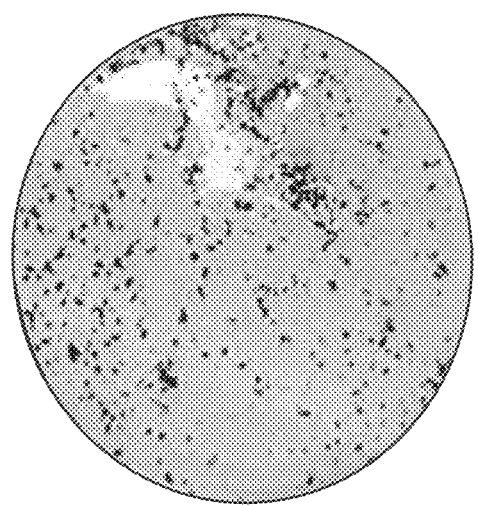
Figure 8:
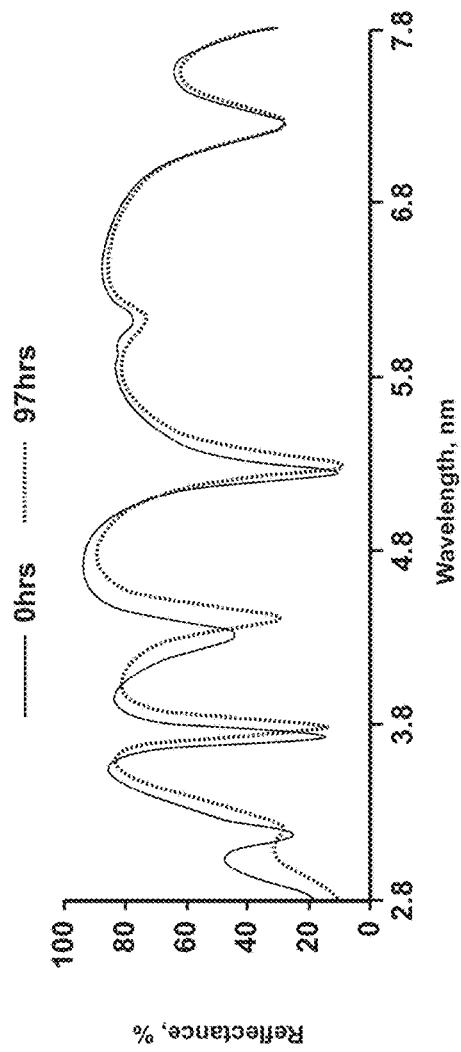
Figure 9:
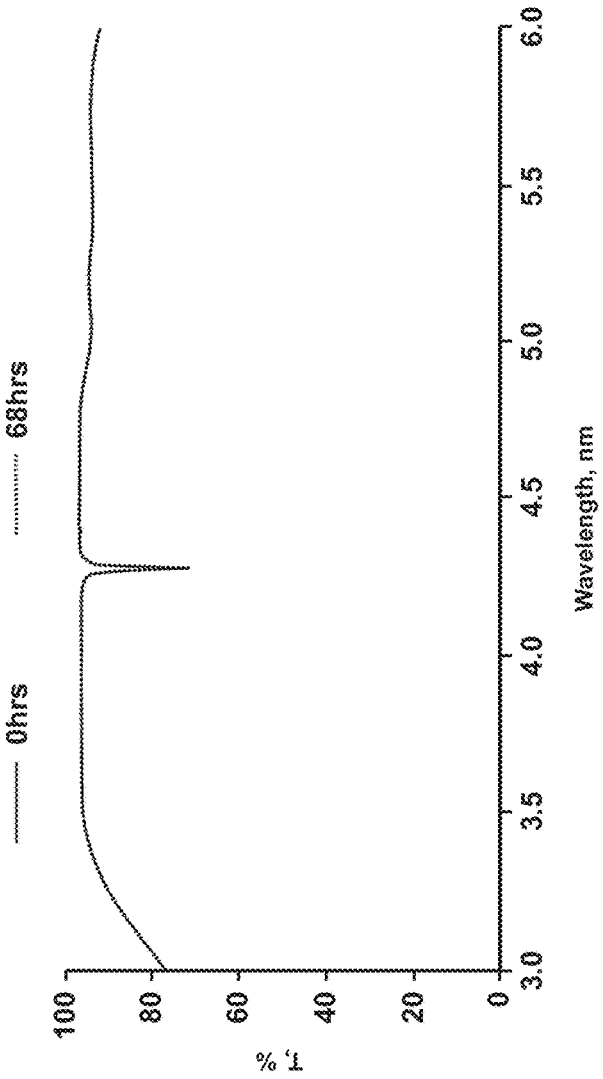
Figure 10:
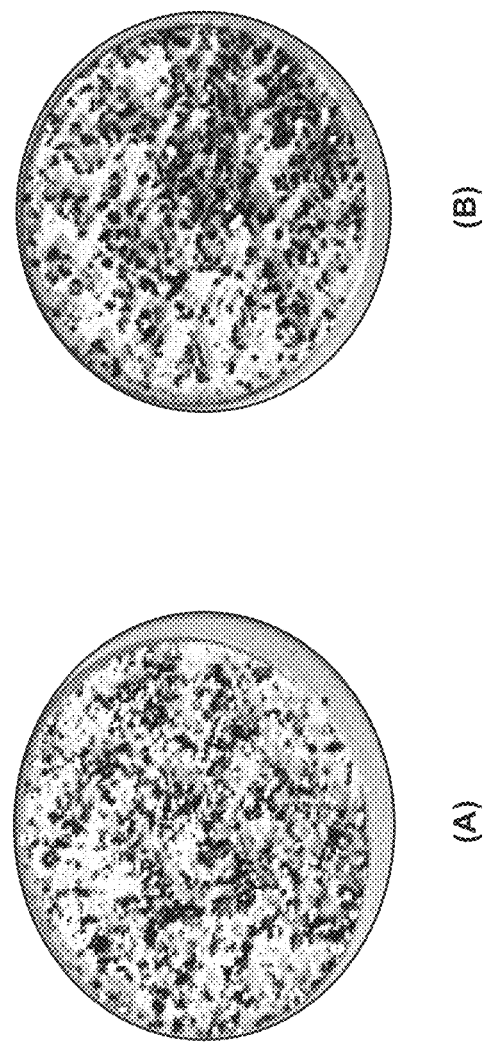
Figure 11:
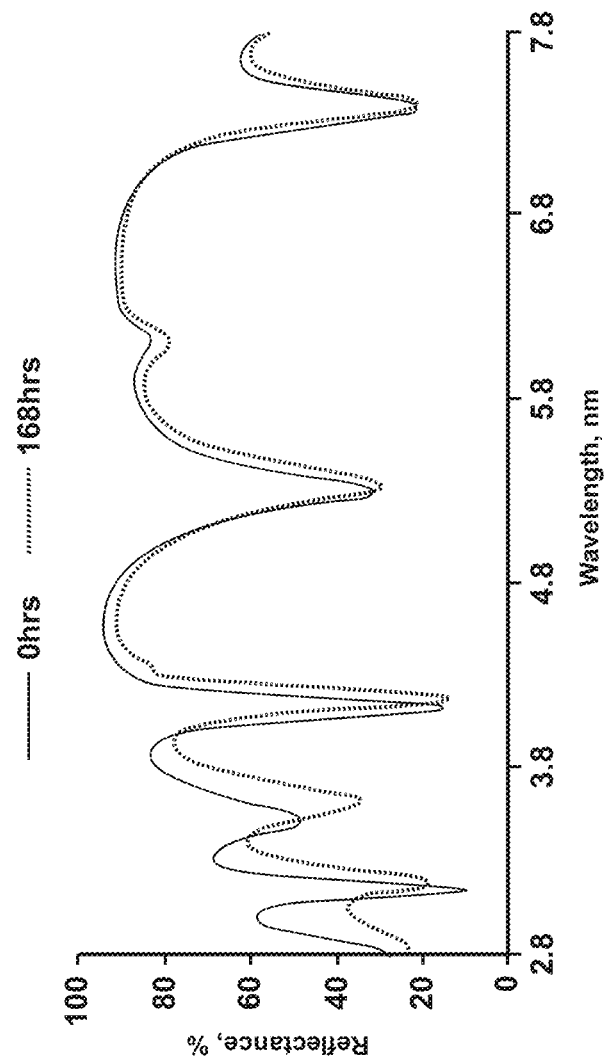

FIG. 7 is an image of an optical element having a ZnS substrate, an SiO$_2$ adhesion layer, and an anti-reflective coating stack, according to aspects of the present disclosure;

FIG. 8 is a plot of the reflectance spectra for an optical element having a ZnS substrate, a silicon adhesion layer, and an anti-reflective coating stack before and after treatment for 97 hours according to the H$_2$SO$_4$—NaCl Soak Test, according to aspects of the present disclosure;

FIG. 9 is a plot of the transmittance spectra for an optical element having a ZnS substrate, a silicon adhesion layer, and an anti-reflective coating stack before and after treatment for 97 hours according to the H$_2$SO$_4$—NaCl Soak Test, according to aspects of the present disclosure;

FIG. 10 shows images of an optical element having ZnS substrate, a silicon adhesion layer, and an anti-reflective coating stack deposited at low (inset A) and high (inset B) ion bombardment energies in an ion assisted sputtering process, according to aspects of the present disclosure; and FIG. 11 is a plot of the reflectance spectra for an optical element having a ZnS substrate, a ZnSe adhesion layer, and an anti-reflective coating stack before and after treatment for 168 hours according to the H$_2$SO$_4$—NaCl Soak Test, according to aspects of the present disclosure.

DETAILED DESCRIPTION

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "formed from" can mean one or more of comprises, consists essentially of, or consists of. For example, a component that is formed from a particular material can comprise the particular material, consist essentially of the particular material, or consist of the particular material.

The term "disposed" is used herein to refer to a layer or sub-layer that is coated, deposited, formed, or otherwise provided onto a surface. The term disposed can include layers/sub-layers provided in direct contact with adjacent layers/sub-layers or layers/sub-layers separated by intervening material which may or may not form a layer. The language "directly disposed" or "disposed directly" is used interchangeably to refer to layers/sub-layers that are in direct contact with an adjacent layer/sublayer.

Durability of a material in a corrosive environment was assessed using ASTM G85-11 "Standard Practice for Modified Salt Spray (Fog) Testing, Annex A4, Salt Spray Test" for the indicated period of time (in days or hours), and is referred to herein as the "SO$_2$-modified Salt Spray Test." Durability of a material in a salt environment as assessed using the ASTM Standard Salt Spray (Fog) Test described in ASTM B117-11 is referred to herein as the "Standard Salt Fog Test". The SO$_2$-modified Salt Spray Test is performed in same manner as the Standard Salt Fog Test with the additional step of continuously flowing SO$_2$ into the salt fog test chamber.

A corrosion resistance screening test, referred to herein as the "H$_2$SO$_4$—NaCl Soak Test," was used in some cases as an indicator of the likelihood of a sample to pass the SO$_2$-modified Salt Spray Test. The H$_2$SO$_4$—NaCl Soak Test included adding sulfuric acid to the standard salt fog solution according to the SO$_2$-modified Salt Spray Test until a pH of 2.5 was reached. The sample was submersed in the solution for the indicated time period.

Unless otherwise stated, adhesion of a coating as reported herein was measured according to the tape pull test standard 4.5.3.1 "Adhesion" ("Adhesion Test") from MIL-C-48497A. Briefly, the coated sample was subjected to the adhesion test using a ½ inch wide cellophane tape conforming to Type I of L-T-90. The adhesive surface of the tape was pressed firmly against the coated surface and quickly removed at an angle normal to the coated surface. A visual inspection of the coating was made.

Unless otherwise stated, the humidity resistance of a sample was assessed according to section 4.5.3.2 "Humidity" from MIL-C-48497A ("Humidity Test"). Briefly, the coated sample was placed into an environmentally controlled test chamber and exposed to a temperature of 120° F. and 95% to 100% relative humidity. The sample was exposed for a minimum of 24 hours. Subsequent to this exposure, the sample was cleaned and evaluated.

Unless otherwise stated, the abrasion resistance of a sample was assessed according to section 4.5.3.3 "Moderate abrasion" from MIL-C-48497A ("Moderate Abrasion Test").

Aspects of the present disclosure relate to optical elements that include an anti-reflective coating stack containing layers of silicon and silicon dioxide for use with substrates made from Group VIA or fluoride-based non-oxide material and methods of making. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Aspects of the present disclosure relate to optical elements having an anti-reflective coating stack that is suitable for use in certain corrosive environments. Aspects of the present disclosure relate to optical elements that include an anti-reflective coating stack containing layers of silicon and silicon dioxide for use with substrates made from Group VIA or fluoride-based non-oxide materials and methods of making. The optical element includes an adhesion layer to facilitate bonding of the anti-reflective coating stack with substrate. In some aspects, the optical element is stable in corrosive environments, as measured according to the ASTM G85-11 $SO_2$-modified Salt Spray Test, Annex A4 (referred to herein as the "$SO_2$-modified Salt Spray Test") for at least 24 hours and in some cases for at least 168 hours. Corrosive and other harsh environmental conditions may affect the physical and/or optical properties of an optical element over time. In some applications, the corrosive environment may result in physical degradation of the optical element, such as delamination of the anti-reflective coating stack from the substrate, delamination of one or more layers of the anti-reflective coating stack, and/or degradation of the anti-reflective coating stack. In some applications, the corrosive environment may affect the optical properties of the anti-reflective coating stack, such as the reflectance of the anti-reflective coating stack. Such changes in the physical and/or optical properties of the optical element may result in the optical element no longer satisfying the desired optical specifications for an intended application. Aspects of the present disclosure relate to optical elements and methods of making said optical elements that provide improvement in the stability of the physical and optical properties of the optical element when exposed to certain corrosive environments.

Figure 1:
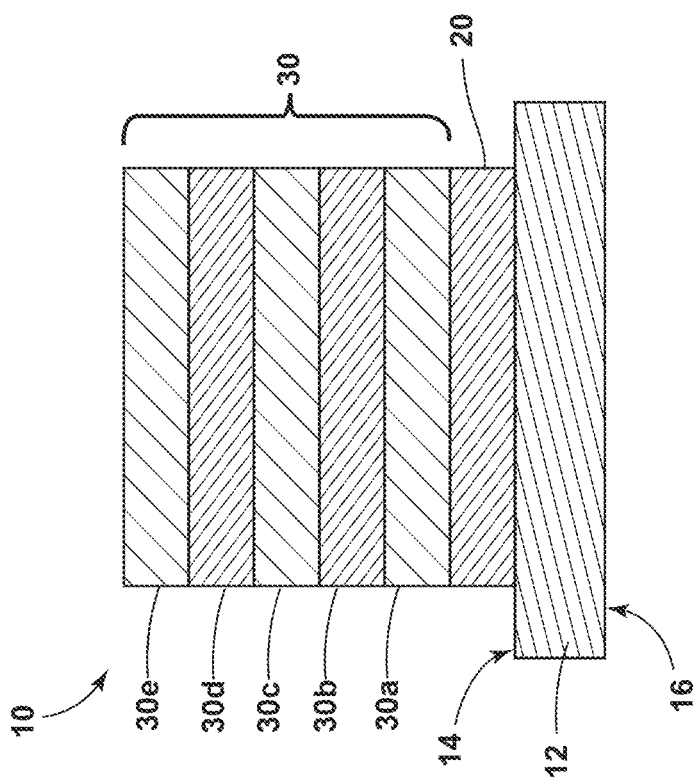
FIG. 1 is a schematic cross-sectional view of an optical element having an adhesion layer and an anti-reflective coating stack, according to aspects of the present disclosure.

Referring to FIG. 1, an optical element 10 is illustrated according to an aspect of the present disclosure. The optical element 10 can be a component of a window or lens of an optical element, surveillance camera, telescope, missile dome, airborne detector, satellite camera, camera, infrared detector, telescope, etc. The optical element 10 can include a substrate 12 having opposing first and second primary surfaces 14 and 16. An adhesion layer 20 is disposed directly on the first primary surface 14 of the substrate 12 and may cover at least a portion of the first primary surface 14. An anti-reflective coating stack 30 is disposed directly on the adhesion layer 20. The anti-reflective coating stack 30 can include at least a first layer 30a disposed directly on the adhesion layer 20 and at least a second layer 30b disposed directly on the first layer 30a. The anti-reflective coating stack 30 can include additional layers 30c, 30d, 30e, and 30f as illustrated, or fewer or greater layers. While the adhesion layer 20 and anti-reflective coating stack 30 is illustrated only on the first primary surface 14 of the substrate 12, it is understood that the adhesion layer 20 and anti-reflective coating stack 30 may be provided on one or both of the first and second primary surfaces 14 and 16.

The substrate 12 can be made from a Group VIA non-oxide material, such as a sulfur, selenium, or tellurium-based material or a fluoride-based material. The substrate 12 may have any suitable shape and dimensions based on the intended application. One or both of the first and second primary surfaces 14 and 16 may define a curved or flat cross-sectional shape. In one example, the substrate 12 is formed from zinc sulfide (ZnS) or zinc selenide (ZnSe). In another example, the substrate is formed from a fluoride-based material such as $CaF_2$, $YF_3$, $YbF_3$, $MgF_2$, $BaF_2$, or $CeF_3$.

The adhesion layer 20 includes a material selected to facilitate adhesion of the anti-reflective coating stack 30 to the substrate 12. In some aspects, the adhesion layer 20 is selected in concert with the anti-reflective coating stack 30 to provide an anti-reflective coating stack 30 capable of passing the $SO_2$-modified Salt Spray Test. The adhesion layer 20 can be selected at least in part based on the material used to form the substrate 12, the material of the first layer 30a of the anti-reflective coating stack 30, and the intended application. The adhesion layer 20 can be selected from sulfide-based materials, selenide-based materials, fluoride-based materials or silicon-based materials. In some aspects, the adhesion layer 20 contains zinc selenide or zinc sulfide. In one example, the adhesion layer 20 can be a sulfur or selenide deficient material (e.g., $ZnS_y$ or $ZnSe_y$, where y<1). In one aspect, the adhesion layer 20 is a layer of silicon containing less than 1.0 atomic % (at %) oxygen. For example, the adhesion layer 20 can be a layer of silicon containing less than 1.0 at % oxygen, less 0.7 at % oxygen, less than 0.5 at % oxygen, less than 0.3 at % oxygen, or less than 0.1 at % oxygen. In some examples, the adhesion layer 20 can contain greater than 99.0 at % silicon, greater than 99.2 at % silicon, greater than 99.3 at % silicon, greater than 99.4 at % silicon, greater than 99.5 at % silicon, greater than 99.6 at % silicon, greater than 99.7 at % silicon, greater than 99.8 at % silicon, or greater than 99.9 at % silicon. In some examples, the adhesion layer 20 can contain essentially 100 at % silicon. Techniques for determining the oxygen content include STEM/EDS and TOF-SIMS. It is understood that when the adhesion layer 20 contains silicon, some trace amount of oxygen may be present, however, this trace amount is not expected to materially affect the adhesion and SO$_2$-modified Salt Spray Test performance of the anti-reflective coating stack 30 described herein.

In some aspects, the adhesion layer 20 is deposited on the first primary surface 14 of the substrate 12 such that the adhesion strength between the adhesion layer 20 and the first primary surface 14 is greater than the stress forces present at the interface between the adhesion layer 20 and the first primary surface 14. The adhesion strength and the stress forces at the interface can be balanced at least in part by adjusting the process parameters by which the adhesion layer 20 is deposited and/or by treatment of the first primary surface 14.

In some aspects, the adhesion layer 20 can have an optical thickness of from 280 nm to 420 nm. For example, the adhesion layer 20 can have an optical thickness of from 280 nm to 420 nm, 280 nm to 400 nm, 280 nm to 380 nm, 280 nm to 360 nm, 280 nm to 340 nm, 280 nm to 320 nm, 280 nm to 300 nm, 300 nm to 420 nm, 300 nm to 400 nm, 300 nm to 380 nm, 300 nm to 360 nm, 300 nm to 340 nm, 300 nm to 320 nm, 320 nm to 420 nm, 320 nm to 400 nm, 320 nm to 380 nm, 320 nm to 360 nm, 320 nm to 340 nm, 340 nm to 420 nm, 340 nm to 400 nm, 340 nm to 380 nm, 340 nm to 360 nm, 360 nm to 420 nm, 360 nm to 400 nm, 360 nm to 380 nm, 380 nm to 420 nm, 380 nm to 400 nm, or 400 nm to 420 nm. In some examples, the adhesion layer 20 can have an optical thickness of 350 nm±20%, 350 nm±10%, or 350 nm±5%.

The anti-reflective coating stack 30 can include a first additional layer of SiO$_x$, where 1.0≤x≤2.0, and a second additional layer of silicon. The first additional layer can include SiO$_x$ where 1.0<x<2.0, 1.0≤x≤1.9, 1.3≤x≤1.9, or 1.6≤x≤1.9. The second additional layer of silicon can include less than 1.0 atomic % (at %) oxygen. For example, the second additional layer of silicon can contain less than 1.0 at % oxygen, less 0.7 at % oxygen, less than 0.5 at % oxygen, less than 0.3 at % oxygen, or less than 0.1 at % oxygen. In some examples, the second additional layer of silicon can contain greater than 99.0 at % silicon, greater than 99.2 at % silicon, greater than 99.3 at % silicon, greater than 99.4 at % silicon, greater than 99.5 at % silicon, greater than 99.6 at % silicon, greater than 99.7 at % silicon, greater than 99.8 at % silicon, or greater than 99.9 at % silicon. In some examples, the second additional layer of silicon can contain essentially 100 at % silicon. In some aspects, the first additional layer is disposed directly on the adhesion layer. The anti-reflective coating stack 30 can include a total of m+1 additional layers of SiO$_x$ and m additional layers of silicon, where m is 1, 2, 3, 4, 5, 6, 7, or 8. In some aspects, the anti-reflective coating stack 30 includes alternating layers of SiO$_x$ and silicon with SiO$_x$ as the last layer (i.e., the layer of the anti-reflective coating stack 30 farthest from the substrate 12), although other patterns of layers of SiO$_x$ and silicon are also envisioned. The particular pattern of layers of SiO$_x$ and silicon may be based at least in part on the desired optical properties of the anti-reflective coating stack 30.

In one example, the anti-reflective coating stack 30 can include multiple additional, alternating layers of SiO$_x$ and Si disposed on the adhesion layer 20 in the following order: SiO$_x$/Si/SiO$_x$. In another example, the anti-reflective coating stack 30 includes the following layers of SiO$_x$ and Si, in order, disposed on the adhesion layer 20: SiO$_x$/Si/SiO$_x$/Si/SiO$_x$. In yet another example, the anti-reflective coating stack 30 includes the following layers of SiO$_x$ and Si, in order, disposed on the adhesion layer 20: SiO$_x$/Si/SiO$_x$/Si/SiO$_x$/Si/SiO$_x$. In yet another example, the anti-reflective coating stack 30 includes the following layers of SiO$_x$ and Si, in order, disposed on the adhesion layer 20: SiO$_x$/Si/SiO$_x$/Si/SiO$_x$/Si/SiO$_x$. In an exemplary embodiment, the adhesion layer 20 is a layer containing silicon.

The oxygen content of the additional layer(s) of SiO$_x$ and the additional layer(s) of silicon can be selected at least in part based on the desired optical properties of the anti-reflective coating stack 30. Additional characteristics of the additional layer(s) of SiO$_x$ and the additional layer(s) of silicon, such as the refractive index, optical thickness, physical thickness, and/or density, can be selected at least in part based on the desired optical properties of the anti-reflective coating stack 30. For example, characteristics such as the oxygen content, refractive index, optical thickness, physical thickness, and/or density of the additional layer(s) of SiO$_x$ and the additional layer(s) of silicon can be selected at least in part to provide the anti-reflective coating stack 30 with a desired reflectance. In some aspects, the first additional layer of SiO$_x$ is essentially the same as any additional layers of SiO$_x$ and the second additional layer of silicon is essentially the same as any additional layers of silicon. It will be understood that there may be some variations between each of the layers of SiO$_x$ and between each of the layers of silicon due to tolerances in the deposition process and/or measurement processes. In some applications, it may be desirable to vary one or more characteristics of the individual SiO$_x$ and silicon layers of the anti-reflective coating stack 30. For example, the oxygen content of different layers of SiO$_x$ in the anti-reflective coating stack 30 can differ or the oxygen content of different layers of Si in the anti-reflective coating stack 30 can differ.

In some aspects, the first additional layer of SiO$_x$, and any subsequent additional layer of SiO$_x$, and the second additional layer of silicon, and any subsequent additional layers of silicon, are low and high refractive index layers, respectively. In some aspects, the additional layer(s) of SiO$_x$ in the anti-reflective coating stack 30 can have a refractive index, as measured at 550 nm, of less than 1.47. In some aspects, the refractive index of the additional layer(s) of SiO$_x$ is less than 1.47, less than 1.46, or less than 1.45, as measured at 550 nm. For example, the refractive index of the at least one silicon dioxide layer can be from 1.44 to 1.47, 1.44 to 1.46, 1.45 to 1.46, or 1.45 to 1.47, as measured at 550 nm.

In some aspects, the additional layer(s) of SiO$_x$ in the anti-reflective coating stack 30 has a density of less than 2.6 g/cm$^3$. In some aspects, the additional layer(s) of SiO$_x$ in the anti-reflective coating stack 30 has a density of less than 2.6 g/cm$^3$, less than 2.55 g/cm$^3$, or less than 2.5 g/cm$^3$. For example, the additional layer(s) of SiO$_x$ in the anti-reflective coating stack 30 can have a density of from 2.4 g/cm$^3$ to 2.6 g/cm$^3$, 2.4 g/cm$^3$ to 2.55 g/cm$^3$, 2.4 g/cm$^3$ to 2.5 g/cm$^3$, 2.5 g/cm$^3$ to 2.6 g/cm$^3$, 2.55 g/cm$^3$ to 2.6 g/cm$^3$, or 2.4 g/cm$^3$ to 2.55 g/cm$^3$. Unless otherwise stated, the density values for the layers of the anti-reflective coating stack 30 reported herein were determined by extrapolation based on the mixing law for two uniformly mixed materials, which can be expressed according to formula (I):

$$n = (n_1 \times V_1) + (n_2 \times V_2) \qquad (I)$$

where $n_1$ and $n_2$ are the refractive index of each of the mixed materials and $V_1$ and $V_2$ are the volume fraction of each of the materials. It is assumed that most of the layer contains voids and pores, which are assumed to a vacuum or filled with gas having a refractive index of 1. For example, the additional layer(s) of SiO$_x$ in the anti-reflective coating stack 30 are assumed to be a uniform mixture of SiO$_x$ and vacuum or gas-filled voids having a refractive index of 1 and a density given by formula (I).

In some aspects, the additional layer(s) of $SiO_x$ has a single layer stress of 400 MPa (compressive) or less. For example, the at least one layer of silicon dioxide can have a single layer stress of 400 MPa or less, 375 MPa or less, 350 MPa or less, 325 MPa or less, 300 MPa or less, 275 MPa or less, 250 MPa or less, or 240 MPa or less (compressive). For example, the additional layer(s) of $SiO_x$ can have a single layer stress of from 200 MPa to 400 MPa, 240 MPa to 400 MPa, 250 MPa to 400 MPa, 275 MPa to 400 MPa, 300 MPa to 400 MPa, 325 MPa to 400 MPa, 350 MPa to 400 MPa, 375 MPa to 400 MP, 200 MPa to 375 MPa, 240 MPa to 375 MPa, 250 MPa to 375 MPa, 275 MPa to 375 MPa, 300 MPa to 375 MPa, 325 MPa to 375 MPa, 350 MPa to 375 MPa, 200 MPa to 350 MPa, 240 MPa to 350 MPa, 250 MPa to 350 MPa, 275 MPa to 350 MPa, 300 MPa to 350 MPa, 325 MPa to 350 MPa, 200 MPa to 325 MPa, 240 MPa to 325 MPa, 250 MPa to 325 MPa, 275 MPa to 325 MPa, 300 MPa to 325 MPa, 200 MPa to 300 MPa, 240 MPa to 300 MPa, 250 MPa to 300 MPa, 275 MPa to 300 MPa, 200 MPa to 275 MPa, 240 MPa to 275 MPa, 250 MPa to 275 MPa, 200 MPa to 250 MPa, or 240 MPa to 250. For purposes of the present disclosure, single layer stress refers to the stress measured on a silicon wafer with a diameter of four inches. When forming the $SiO_x$ layer on the silicon wafer for measurement of single layer stress, the same deposition conditions and same layer thickness as used in the anti-reflective coating stack is used.

In some aspects, the anti-reflective coating stack 30 can have a reflectance of 1.0% or less at at least one wavelength between 1.0 μm and 8.0 μm. For example, the anti-reflective coating stack 30 can have a reflectance of 1.0% or less, 0.9% or less, 0.8% or less, 0.7% or less, or 0.6% or less at at least one wavelength between 1.0 μm and 8.0 μm. In some aspects, the anti-reflective coating stack 30 can have a reflectance of 1.0% or less, 0.9% or less, 0.8% or less, 0.7% or less, or 0.6% or less for a plurality of or over a range of wavelengths between 1.0 μm and 8.0 μm. For example, the anti-reflective coating stack 30 can have a reflectance of 1.0% or less, 0.9% or less, 0.8% or less, 0.7% or less, or 0.6% or less as measured at each wavelength (or a plurality of wavelengths) from between 1.0 μm and 8.0 μm, 1.0 μm and 7.0 μm, 1.0 μm and 6.0 μm, 1.0 μm and 5.0 μm, 1.0 μm and 4.0 μm, 1.0 μm and 3.0 μm, 2.0 μm and 8.0 μm, 2.0 μm and 7.0 μm, 2.0 μm and 6.0 μm, 2.0 μm and 5.0 μm, 2.0 μm and 4.0 μm, 2.0 μm and 3.0 μm, 3.0 μm and 8.0 μm, 3.0 μm and 7.0 μm, 3.0 μm and 6.0 μm, 3.0 μm and 5.0 μm, 3.0 μm and 4.0 μm, 4.0 μm and 8.0 μm, 4.0 μm and 7.0 μm, 4.0 μm and 6.0 μm, 4.0 μm and 5.0 μm, 5.0 μm and 8.0 μm, or 5.0 μm and 7.0 μm.

In some aspects, the anti-reflective coating stack 30 can have a reflectance of 0.6% or less, as measured at each wavelength between 3.8 μm to 5.0 μm. In some aspects the anti-reflective coating stack 30 can have a reflectance of 0.6% or less, as measured at each wavelength (or a plurality of wavelengths) between 4.4 μm to 5.2 μm, 3.39 μm to 5.6 μm, 3.8 μm to 5.0 μm, 3.8 μm to 5.5 μm, 3.8 μm to 6 μm, 3.5 μm to 5.0 μm, 3.5 μm to 5.5 μm, 3.5 μm to 6 μm, 3 μm to 5.0 μm, 3 μm to 5.5 μm, 3 μm to 6 μm, 2.5 μm to 5.0 μm, 2.5 μm to 5.5 μm, 2.5 μm to 6 μm, 2 μm to 5.0 μm, 2 μm to 5.5 μm, 2 μm to 6 μm, 1.5 μm to 5.0 μm, 1.5 μm to 5.5 μm, 1.5 μm to 6 μm, 1 μm to 5.0 μm, 1 μm to 5.5 μm, or 1 μm to 6 μm.

In some aspects, the anti-reflective coating stack 30 of the optical element 10 is capable of passing the $SO_2$-modified Salt Spray Test for at least 24 hours. In some aspects, the anti-reflective coating stack 30 of the optical element 10 is capable of passing the $SO_2$-modified Salt Spray Test for at least 24 hours, for at least 48 hours, for at least 72 hours, for at least 96 hours, for at least 120 hours, for at least 144 hours, or for at least 168 hours. In some aspects the reflectance characteristics of the anti-reflective coating stack 30 remain stable after exposure to a corrosive environment. For example, in some aspects, the anti-reflective coating stack 30 exhibits a change in reflectance of less than ±0.2%, less than 0.1%, or less than 0.05%, as measured at at least one wavelength between 1.0 μm and 8.0 μm, after exposure to a pH 2.5 $H_2SO_4$—NaCl solution for 72 hours according to the $H_2SO_4$—NaCl Soak Test. In some examples, the anti-reflective coating stack 30 exhibits a change in reflectance of less than ±0.2%, less than 0.1%, or less than 0.05%, as measured at each wavelength between 3.39 μm to 5.6 μm, after exposure to a pH 2.5 $H_2SO_4$—NaCl solution for 72 hours according to the $H_2SO_4$—NaCl Soak Test. Thus, in some aspects, the anti-reflective coating stack 30 exhibits physical stability (i.e., remains adhered to the substrate 12 by the adhesion layer 20 and/or sub-layers of the anti-reflective coating stack 30 remain intact) in combination with optical stability, as determined based on the stability of the reflectance spectrum, when exposed to certain corrosive environments.

The adhesion layer 20 and the anti-reflective coating stack 30 can be deposited on the substrate 12 to form the optical element 10 according to aspects of the present disclosure using physical vapor deposition (PVD) processes. Without wishing to be limited by any theory, it is believed that the stability of the optical elements of the present disclosure in certain corrosive environments is due at least in part to depositing the adhesion layer 20 and the anti-reflective coating stack 30 using an adjustable PVD process that controls the density and stress levels in the deposited layers. Parameters of the PVD process can be set to adjust the density of each deposited layer in order to affect the atomic level defects in the coating, such as voids and pores or oxygen concentration. It is believed that atomic level defects in the adhesion layer 20 and/or the anti-reflective coating stack 30 can result in accelerated degradation of these materials in certain corrosive environments. The parameters of the PVD process can also be set to control the stress levels in the deposited layers to decrease the likelihood of failure (e.g. delamination) at the interface between the adhesion layer 20 and the substrate 12 and the interface of the adhesion layer 20 and the anti-reflective coating stack 30 in a corrosive environment. It is believed that when the densification of a layer (e.g., the adhesion layer 20 and/or a sub-layer of the anti-reflective coating stack 30) is low, the level of porosity (presence of voids and pores) in the layer is high. These voids and pores in the layer may provide a route by which corrosive materials can penetrate and degrade the layer. As the densification of the layer increases, the porosity of the material decreases, which may facilitate improving the stability of the layer in corrosive environments. However, high levels of densification in a layer may also increase the compressive stress of the layer, which may increase the likelihood of the layer to delaminate or deform. Aspects of the present disclosure relate to methods for forming the adhesion layer 20 and the layers of the anti-reflective coating stack 30 in a manner that balances densification (porosity) and stress in the layers to improve the physical and optical stability of the optical element 10 in certain corrosive environments. It has also been found that cleaning and activating the primary surface 14 of the substrate 12 prior to deposition of the adhesion layer 20 may improve the stability of the bond between the adhesion layer 20 and the substrate 12 and thus may contribute to improving the physical and optical stability of the optical element 10 in certain corrosive environments.

According to aspects of the present disclosure, a method for forming the optical element 10 described herein includes depositing the adhesion layer 20 and the anti-reflective coating stack 30 on the substrate 12 using a PVD process such as thermal evaporation, e-beam evaporation, and sputtering (e.g., magnetron sputtering, ion sputtering, ion assisted sputtering). Process conditions such as Argon gas flow, pressure during deposition, deposition rate, bombardment flux, kinetic energy, and/or ion assistance can be selected to provide layers having the desired optical thickness, physical thickness, densification, and stress.

Prior to depositing the adhesion layer 20 directly onto the first primary surface 14 of the substrate 12, the first primary surface 14 can be treated under vacuum in an ion bombardment process in which a power applied to the ion source is at least 100 Watts to clean and activate the first primary surface 14. The power applied to the ion source and the ion treatment time period can be selected to provide the desired level of cleaning and activation to facilitate adhesion of the adhesion layer 20 to the substrate 12. In one example, the ion bombardment with Argon ions can be achieved through an ion gun with an Argon gas flow in which a power applied to the ion gun is at least 100 Watts. In some examples, the power applied to the ion source is at least 100 Watts, at least 150 Watts, at least 200 Watts, at least 250 Watts, or at least 300 Watts for a time period of at least 3 minutes, at least 5 minutes, at least 10 minutes, at least 15 minutes, at least 20 minutes, at least 25 minutes, or at least 30 minutes. Without wishing to be limited by any theory, it is believed that ion bombardment of the first primary surface 14 can facilitate cleaning the exposed surface and removing contaminants from the surface. The bombardment energy and time period can be selected to remove contaminants from the exposed surface without damaging the surface. The ion bombardment treatment process can also activate the exposed surface by increasing the number of atoms available at the exposed surface for bonding with the atoms of the deposited adhesion layer 20. For example, when a silicon adhesion layer is to be deposited on a ZnS substrate, activation of the exposed surface by the ion bombardment treatment may result in an increase in the availability of sulfur atoms for bonding with the incoming silicon ions. In another example, a ZnS or ZnSe substrate can be bombarded with Argon ion energies greater than 300 eV to generate a Zn rich surface by etching S or Se, respectively, which can facilitate adhesion of a subsequently applied adhesion layer, such as a silicon adhesion layer, for example.

Without wishing to be bound by any theory, it is believed that surface cleaning and activation are factors that can affect interfacial bonding strength between the substrate 12 and the adhesion layer 20. For an adhesion layer with compressive stress, interfacial bonding strength is competing with residual stress: when the residual compressive stress surpasses the interfacial bonding strength, the adhesion layer can fail at the interface and delamination or peel off can occur. Conversely, if the stress level of the adhesion layer is lower than the interfacial bonding strength, the adhesion layer may remain physically intact. In the anti-reflective coating stack 30, the stress of the adhesion layer 20 is determined by the net stress of all layers in the stack. It is desirable that the stress and bonding strength of the adhesion layer be reproducible during the deposition process. However, the interfacial bonding strength at the substrate interface can be a variable process parameter due to surface treatment of the substrate 12 during a cleaning/activation process. For example, if a substrate 12 has a "dirty surface" with thick absorption of contaminants (e.g., carbon-containing compounds), traditional ion beam cleaning processes may not remove enough of the contaminants, which might affect the bonding strength of the adhesion layer 20 and the substrate 12. In this scenario, the stress in the anti-reflective coating stack 30 may surpass the bonding strength between the adhesion layer 20 and the substrate 12, which might lead to failure of the anti-reflective coating stack 30 in corrosive conditions, even when the deposition conditions remain the same due to the variability in the condition of the primary surface 14 of the substrate 12. In some aspects of the present disclosure, the substrate 12 is cleaned in-situ using an ion gun operating at sufficient power and for a sufficient period of time to reproducibly clean and activate the primary surface 14 of the substrate 12 such that the primary surface 14 remains clean after deposition flux covers the primary surface 14. Activation is another factor that can improve interfacial bonding between the primary surface 14 and the adhesion layer 20. A cleaned surface does not necessarily mean that the surface will bond to the incoming flux of atoms of the adhesion layer if the bonds at the surface are already saturated in one way or another. For example, some residual gas including $N_2$, $O_2$, OH, $H_2O$ may still exist within the deposition chamber. Depending on the deposition pressure and time between cleaning and deposition, the primary surface 14 may absorb these residual species and at least partially saturate and/or weaken the bonds at the primary surface 14. In some applications, the adhesion layer 20 is a material that is different than the substrate 12 and surface cleaning and activation may be needed to facilitate bonding between the incoming atoms of the adhesion layer 20 and the atoms exposed at the primary surface 14.

Subsequent to cleaning and activating the primary surface 14 of the substrate 12, the adhesion layer 20 can be deposited directly onto the exposed surface of the substrate 12. PVD process conditions such as Argon gas flow, pressure during deposition, deposition rate, bombardment flux, kinetic energy, and ion assistance can be selected to provide the adhesion layer 20 with the desired optical thickness, physical thickness, densification, and stress. In some aspects, the adhesion layer 20 can be deposited use ion assisted sputtering to facilitate controlling the densification and stress of the adhesion layer 20. The anti-reflective coating stack 30 can be deposited directly onto the adhesion layer 20 by sequentially depositing the individual layers of the anti-reflective coating stack 30 (e.g., layers 30a-30f). For example, a first additional layer of $SiO_x$, where x is as described above, can be deposited directly onto the adhesion layer 20. A second additional layer of silicon can be deposited on the first additional layer of $SiO_x$. Additional layers of $SiO_x$ and silicon can be deposited to provide the anti-reflective coating stack 30 with the desired optical properties and thickness. Process conditions such as Argon gas flow, pressure during deposition, deposition rate, bombardment flux, kinetic energy, and ion assistance can be selected to provide each of the layers of the anti-reflective coating stack with the desired characteristics. In some aspects, the layers of the anti-reflective coating stack 30 can be deposited using ion assisted sputtering to facilitate controlling the densification and stress of each layer. According to one aspect of the present disclosure, the adhesion layer 20 and the individual layers of the anti-reflective coating stack 30 can be deposited in an alternating pattern of tensile and compressive stresses to balance the overall stress in the adhesion layer 20 and the anti-reflective coating stack 30 to facilitate maintaining the interfacial bonds between the adhesion layer 20 and the substrate 12 and between the adhesion layer 20 and the anti-reflective coating stack 30.

Without wishing to be limited by any theory, it is believed that as the number of layers in the anti-reflective stack 30 increases, the stress of the additional layers can be controlled in order to accommodate the accumulated compressive force generated by the upper layers (i.e., layers farthest from the adhesion layer 20). Thus, in some applications, the upper layers of the anti-reflective stack 30 may have a lower density, and thus less compressive stress, than layers closer to the adhesion layer 20. The balance of density and stress in the individual layers of the anti-reflective stack 30 can be adjusted to provide an anti-reflective coating stack 30 having a density sufficient to survive in certain corrosive environments in combination with a stress level that is low enough to provide the adhesion layer 20 and anti-reflective stack 30 with the desired physical stability.

In one aspect, the oxygen content, optical thickness, density, and physical thickness of the additional layers of $SiO_x$ and silicon forming the anti-reflective coating 30, and the overall physical thickness of the anti-reflective coating 30 can be selected to provide the anti-reflective coating 30 with the desired optical properties. In one example, the oxygen content of the first additional layer of $SiO_x$ of the anti-reflective coating 30 (and any subsequent layers of $SiO_x$) can be controlled based on the supply of oxygen gas flow during deposition. In some examples, excess oxygen gas flow is provided during deposition to favor deposition of $SiO_2$. In some examples, a low pressure and pure Argon gas is used during deposition of silicon to favor depositing a layer consisting essentially of silicon for the second additional layer of the anti-reflective coating 30 (and any subsequent layers of silicon in the anti-reflective coating stack 30).

Without wishing to be limited by any theory, it is believed that a combination of the stress of the adhesion layer 20 and the anti-reflective coating stack 30 and a total thickness of the adhesion layer 20 and the anti-reflective coating stack 30 generates stress forces at the interface of the substrate 12 and the adhesion layer 20. If the stress forces at the interface of the substrate 12 and the adhesion layer 20 become greater than the bond forces between the substrate 12 and the adhesion layer 20, delamination and/or deformation may occur. In some aspects, the individual layers of the adhesion layer 20 and the anti-reflective coating stack 30 can be deposited such that a total stack stress and total stack thickness satisfies a predetermined stress-thickness factor. Total stack stress corresponds to the net stress of adhesion layer 20 and all layers (e.g. 30a, 30b, ...) of the anti-reflective coating stack 30. Total stack thickness corresponds to the combined thicknesses of adhesion layer 20 and all layers (e.g. 30a, 30b, ...) of the anti-reflective coating stack 30. The stress-thickness factor can be calculated by multiplying the total stack stress (in MPa) by the total stack thickness (in micrometers) and converting to force (in nN) per nanometer. In some examples, the adhesion layer 20 and the anti-reflective coating stack 30 have a stress-thickness factor of less than 1375 nN/nm, or less than 1300 nN/nm, or less than 1200 nN/nm, or less than 1100 nN/nm, or less than 1000 nN/nm.

EXAMPLES

The following examples describe various features and advantages provided by the disclosure, and are in no way intended to limit the invention and appended claims.

Example 1

Table 1 below lists the components of an exemplary optical element, Example 1A, according to the present disclosure including a silicon adhesion layer and an $SiO_2$/Si anti-reflective coating stack and a pass band of 4.4 μm to 5.2 μm. The total physical thickness of the silicon adhesion layer and the anti-reflective coating stack was 2.6 μm. Example 1A included a ZnS substrate in which the surface was cleaned and activated by an ion bombardment treatment according to aspects of the disclosure (30 minutes under vacuum conditions (0.0003 Torr) using an ion source operating at 5 A and 58V). Deposition conditions for the Si and $SiO_2$ layers are as described in Table 3 below. Example 1A passed the $SO_2$-modified Salt Spray Test after 7 days and passed the $H_2SO_4$—NaCl Soak Test after 7 days.

TABLE 1

Example 1A Optical Element

| Component | Material | Optical Thickness (nm) |
|---|---|---|
| Substrate | ZnS | 350.816 |
| Adhesion Layer | Si | 170.027 |
| Anti-reflective Coating (Layer 1) | $SiO_2$ | 2246.822 |
| Anti-reflective Coating (Layer 2) | Si | 254.929 |
| Anti-reflective Coating (Layer 3) | $SiO_2$ | 352.416 |
| Anti-reflective Coating (Layer 4) | Si | 1272.086 |
| Anti-reflective Coating (Layer 5) | $SiO_2$ | 4647.096 |

Example 2

Example 2A and Example 2B were both optical elements having a ZnS substrate, a silicon adhesion layer, and an anti-reflective coating stack containing layers of $SiO_2$ and Si in the order shown in Tables 2 and 3 below. The adhesion layer and anti-reflective coating stack of Example 2A was deposited using an e-beam PVD process according to the parameters listed in Table 2. The adhesion layer and anti-reflective coating stack of Example 2B was deposited using ion assisted sputtering PVD process according to the parameters listed in Table 3.

TABLE 2

E-Beam Evaporation Parameters for Example 2A

| | | | Ion Gun | | |
|---|---|---|---|---|---|
| Component | Source Type | Material | Gas Type | Flow (sccm) | Current/Voltage |
| Adhesion Layer | E-Gun | Si | Ar/Ar | 90/0 | 5 |
| Anti-reflective Coating (Layer 1) | E-Gun | $SiO_2$ | $O_2$/NA | 30/0 | 5 |
| Anti-reflective Coating (Layer 2) | E-Gun | Si | Ar/Ar | 90/0 | 5 |
| Anti-reflective Coating (Layer 3) | E-Gun | $SiO_2$ | $O_2$/NA | 30/0 | 5 |
| Anti-reflective Coating (Layer 4) | E-Gun | Si | Ar/Ar | 90/0 | 5 |

TABLE 2-continued

E-Beam Evaporation Parameters for Example 2A

| Anti-reflective Coating (Layer 5) | E-Gun | $SiO_2$ | $O_2$/NA | 30/0 | 5 |
|---|---|---|---|---|---|
| Anti-reflective Coating (Layer 6) | E-Gun | $SiO_2$ | $O_2$/NA | 30/0 | 5 |

| Current (A) | Voltage (V) | Pressure (Torr) | Rate (Å/sec.) | Thickness (nm) |
|---|---|---|---|---|
| 0.53 | 6.13 | $5.5 \times 10^{-4}$ | 2.0 | 1.497 |
| 0.065 | 6.13 | $1.5 \times 10^{-4}$ | 4.0 | 1.922 |
| 0.53 | 6.13 | $5.5 \times 10^{-4}$ | 2.0 | 9.589 |
| 0.065 | 6.13 | $1.5 \times 10^{-4}$ | 4.0 | 2.882 |
| 0.53 | 6.13 | $5.5 \times 10^{-4}$ | 2.0 | 1.621 |
| 0.065 | 6.13 | $1.5 \times 10^{-4}$ | 4.0 | 4.789 |
| 0.065 | 6.13 | $1.5 \times 10^{-4}$ | 4.0 | 9.593 |

TABLE 3

Ion Assisted Sputtering Parameters for Example 2B

| | Ion Gun | | | | |
|---|---|---|---|---|---|
| Component | Source Type | Material | Gas Type | Flow | Current/Voltage |
| Adhesion Layer | Sputter | Si | Ar/Ar | 90/60 | 5 |
| Anti-reflective Coating (Layer 1) | Sputter | $SiO_2$ | $O_2$/Ar | 95/60 | 5 |
| Anti-reflective Coating (Layer 2) | Sputter | Si | Ar/Ar | 90/60 | 5 |
| Anti-reflective Coating (Layer 3) | Sputter | $SiO_2$ | $O_2$/Ar | 95/60 | 5 |
| Anti-reflective Coating (Layer 4) | Sputter | Si | Ar/Ar | 90/60 | 5 |
| Anti-reflective Coating (Layer 5) | Sputter | $SiO_2$ | $O_2$/Ar | 95/60 | 5 |

| Current (A) | Voltage (V) | Power (kW) | Pressure (Torr) | Rate (AngstromÅ/sec.) | Thickness (nm) |
|---|---|---|---|---|---|
| 5.12 | 768 | 0.75 | $2.1 \times 10^{-3}$ | 2.0 | 1.357 |
| 8.5 | 815 | 4.40 | $3.3 \times 10^{-3}$ | 3.3 | 1.610 |
| 5.12 | 768 | 0.75 | $2.1 \times 10^{-3}$ | 2.0 | 8.692 |
| 8.5 | 815 | 4.40 | $3.3 \times 10^{-3}$ | 3.3 | 2.414 |
| 5.12 | 768 | 0.75 | $2.1 \times 10^{-3}$ | 2.0 | 1.363 |
| 8.5 | 815 | 4.40 | $3.3 \times 10^{-3}$ | 3.3 | 12.050 |

Figure 2:
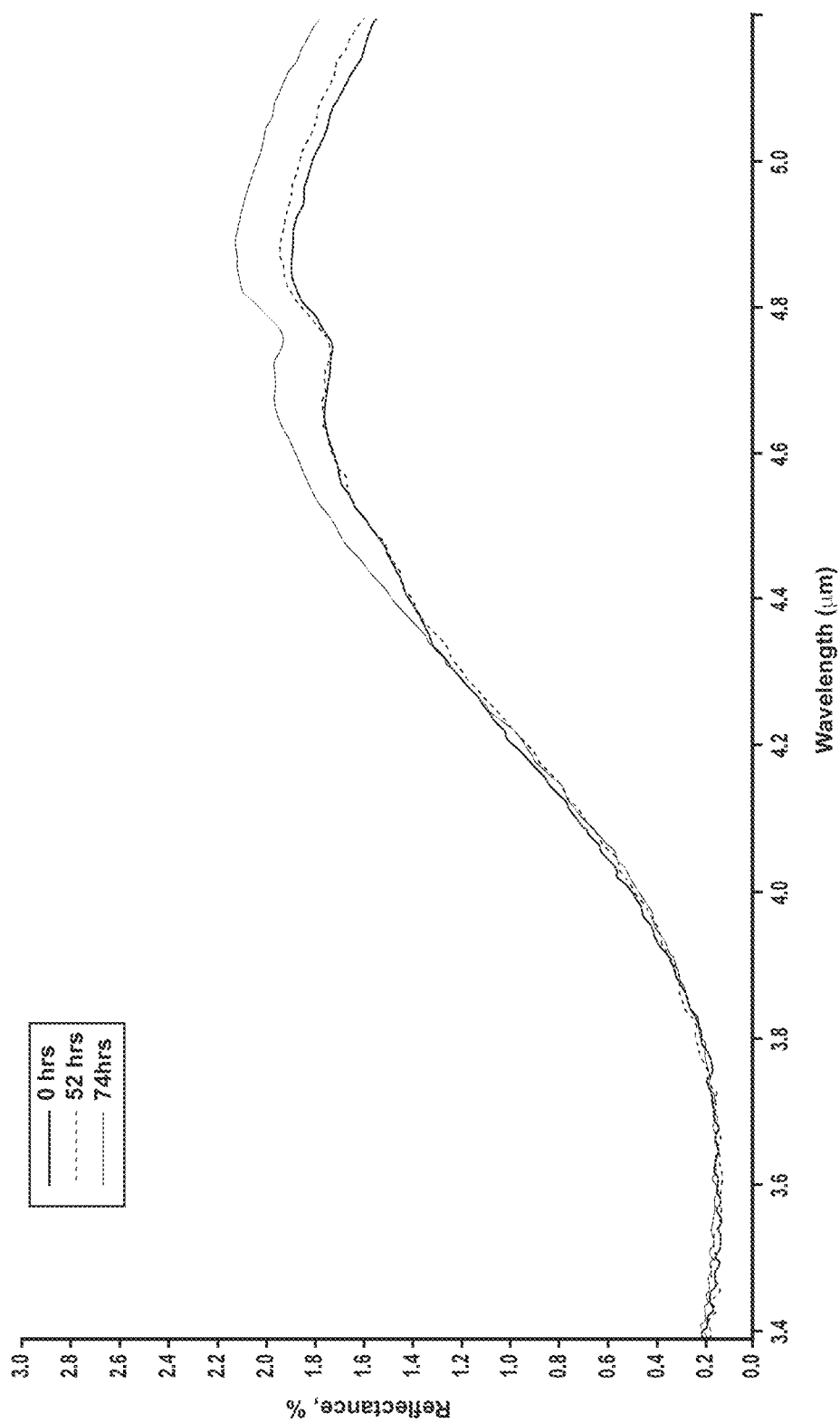
FIG. 2 is a plot illustrating the reflectance spectra of an optical element having a ZnS substrate, a silicon adhesion layer, and an anti-reflective coating stack depositing using an e-beam evaporative process before and after 52 hours and 74 hours of treatment according to the $H_2SO_4$—NaCl Soak Test, according to aspects of the present disclosure.
Figure 3:
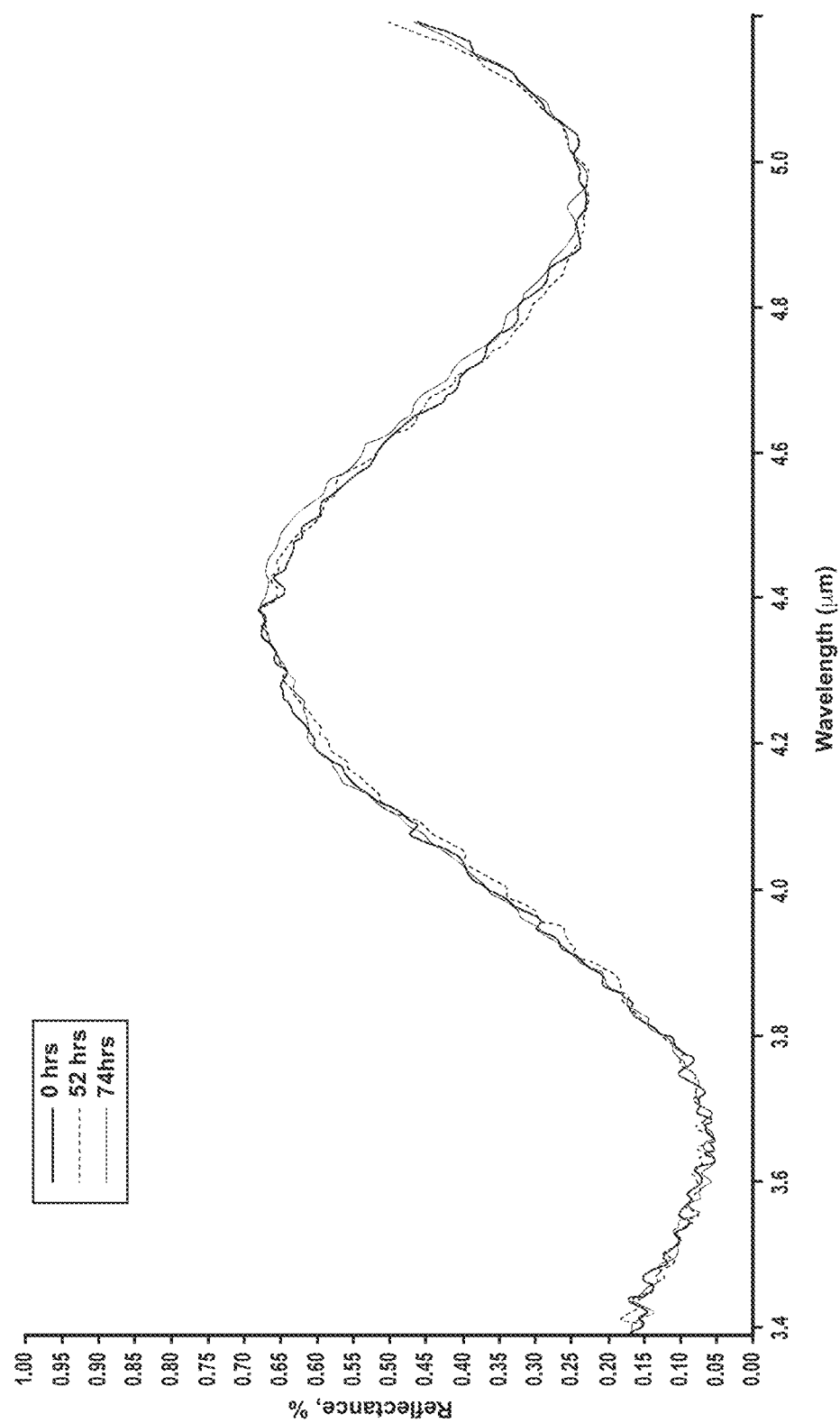
FIG. 3 is a plot illustrating the reflectance spectra of an optical element having a ZnS substrate, a silicon adhesion layer, and an anti-reflective coating stack depositing using an ion assisted sputtering process before and after 52 hours and 74 hours of treatment according to the $H_2SO_4$—NaCl Soak Test, according to aspects of the present disclosure.

FIGS. 2 and 3 illustrate reflectance spectra for Examples 2A and Example 2B before exposure to $H_2SO_4$—NaCl Soak Test solution (0 hours), and after 52 hours and 72 hours of exposure. As illustrated in FIG. 2, over time the reflectance spectrum for Example 2A shifts, indicating that the adhesion layer and/or anti-reflective layer are degrading/deforming in the presence of the corrosive salt solution. As illustrated in FIG. 3, the reflectance spectra for Example 2B over time is relatively stable, indicating that Example 2B is stable in corrosive environments and may pass the $SO_2$-modified Salt Spray Test. Example 2A is an example of an optical element formed using a process that deposits layers having a low density and a low stress, whereas Example 2B is an example of an optical element formed using a process that deposits layers having a more balanced density and stress. Without wishing to be limited by any theory, it is believed that the low density layers of Example 2A have voids/pores that make the layers susceptible to degradation in corrosive salt environments.

Example 4

Figure 4:
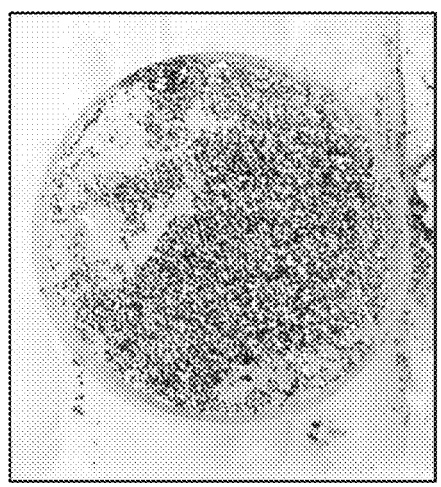
FIG. 4 is an image of an optical element having a ZnS substrate, a ZnO adhesion layer, and an anti-reflective coating stack, according to aspects of the present disclosure.

Example 4A was an optical element having a ZnS substrate, a ZnO adhesion layer, and an anti-reflective coating stack containing layers of $SiO_2$ and Si in the following order, starting with the layer disposed directly on the ZnO adhesion layer: $Si/SiO_2/Si/SiO_2/Si/SiO_2$. The adhesion layer and anti-reflective coating stack was deposited using an ion-assisted sputtering process that produced layers having a higher compressive stress. Example 4A passed the Adhesion Test, Humidity Test, Moderate Abrasion Test, and the Standard Salt Spray Test. However, Example 4A did not pass the $SO_2$-modified Salt Spray Test after 24 hours. FIG. 4 is a photograph of Example 4A showing that adhesion to the substrate failed, either at the interface between the adhesion layer and the substrate and/or at the interface between the adhesion layer and the anti-reflective coating stack. Additional examples similar to Example 4A, except using adhesion layers made from Si, $SiO_2$, ZnSe, $YbF_3$, and Ge, using an ion-assisted sputtering process that produced layers having a high compressive stress failed in a similar manner.

Example 5

Figure 5:
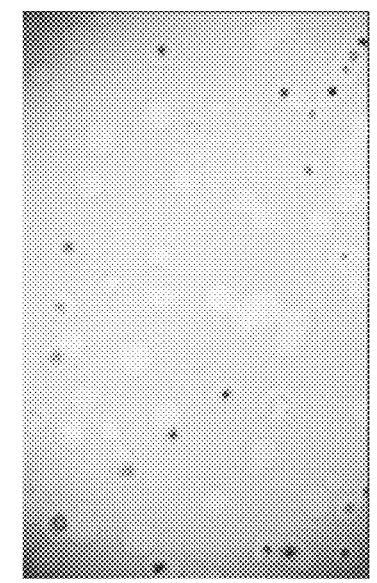
FIG. 5 shows images of an optical element having a ZnS substrate, a ZnSe adhesion layer, and an anti-reflective coating stack before cleaning (inset A), after cleaning (inset B), and magnification of corrosion spots after treatment for 168 hours according to the $SO_2$-modified Salt Spray Test (inset C), according to aspects of the present disclosure.
Figure 5:
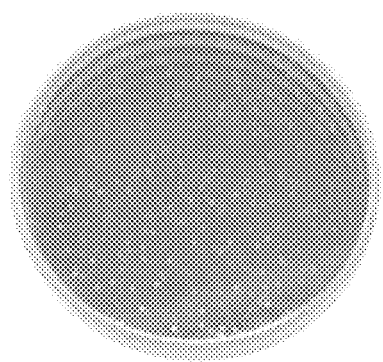
Figure 5:
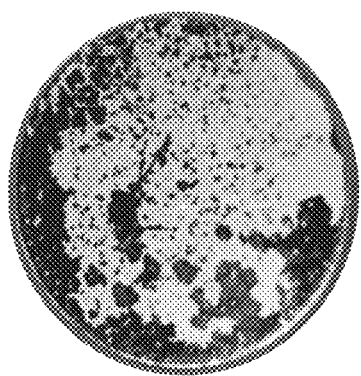
Figure 6:
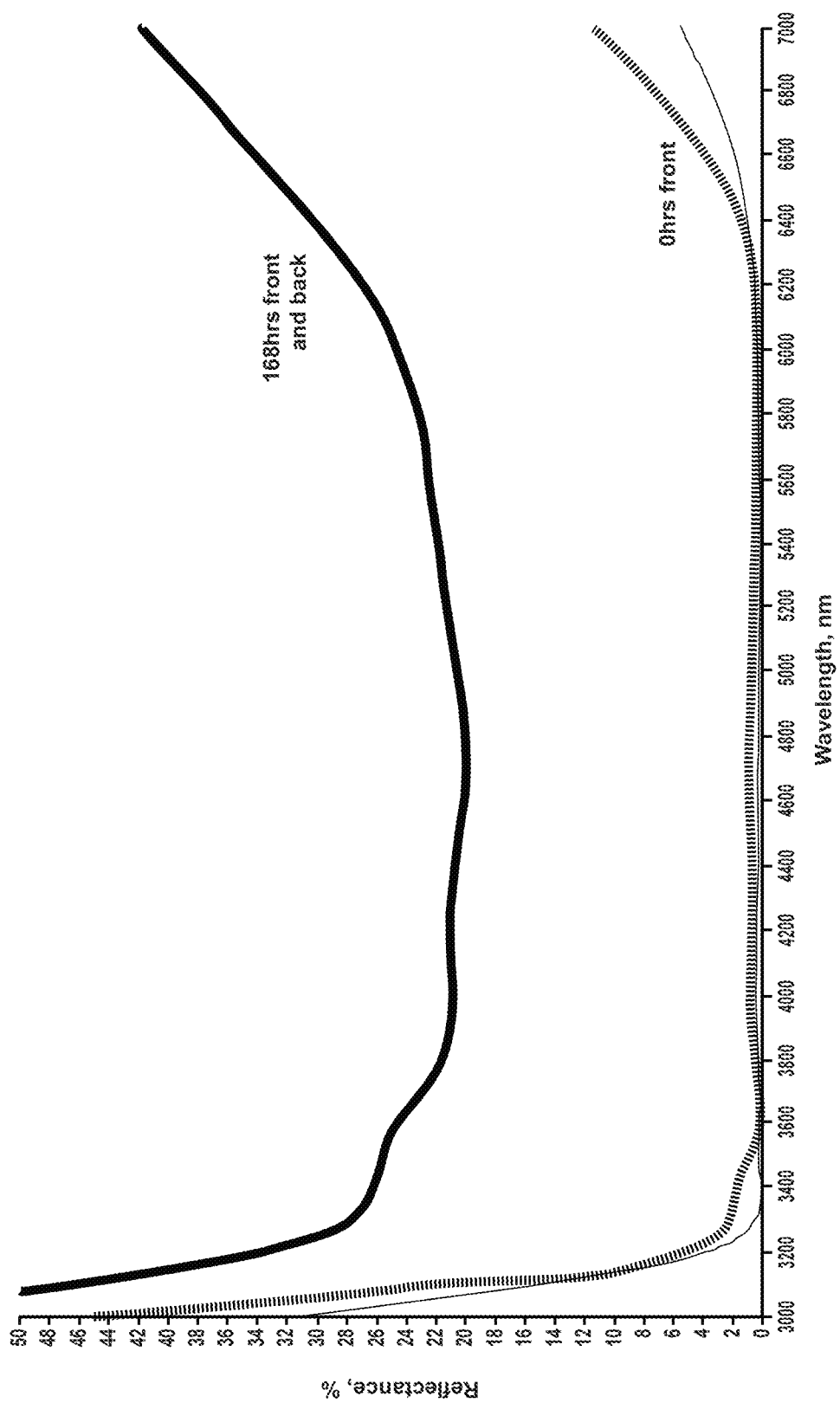
FIG. 6 is a plot illustrating the reflectance spectra of the optical element of FIG. 5 before and after treatment for 168 hours according to the SO$_2$-modified Salt Spray Test, according to aspects of the present disclosure.

Example 5A was an optical element having a ZnS substrate with a ZnSe adhesion layer and an anti-reflective coating stack containing the following layers, in this order: $YbF_3/ZnSe/YbF_3/ZnSe/YbF_3/ZnSe/YbF_3/ZnSe/YbF_3/ZnSe/YbF_3/ZnSe/YbF_3/ZnSe/YbF_3/ZnSe/YbF_3$. The ZnSe adhesion layer and anti-reflective coating stack was deposited using thermal evaporation. Example 5A passed the Adhesion Test, Humidity Test, Moderate Abrasion Test, and the Standard Salt Spray Test. However, Example 5A did not pass the $SO_2$-modified Salt Spray Test after 168 hours. FIG. 5 shows images of Example 5A after the 168 hour exposure in the $SO_2$-modified Salt Spray Test. Part (A) of FIG. 5 shows chemical reaction residuals were present on the surface before cleaning. Part (B) of FIG. 5 shows the surface after cleaning to remove the chemical reaction residuals. Part (C) of FIG. 5 is a 34× magnification of Part (B) of FIG. 5 that shows visible corrosion spots. The images suggest that the anti-reflective coating failed at the upper layers (i.e., not near the interface with the adhesion layer or substrate). FIG. 6 shows that the reflectance spectra for Example 5A shifted dramatically following the $SO_2$-modified Salt Spray Test after 168 hours and no longer satisfied a typical reflectance specification of less than 0.6% or even less than 1% between about 3600 nm and 6400 nm.

Example 6

Example 6A was an optical element having a ZnS substrate, a $SiO_2$ adhesion layer, and an anti-reflective coating stack containing layers of $SiO_2$ and Si in the following order, starting with the layer disposed directly on the $SiO_2$ adhesion layer: $Si/SiO_2/Si/SiO_2/Si/SiO_2$. Example 6A was prepared using ion assisted sputtering to produce higher density, higher compressive stress layers. Example 6A was tested using the $H_2SO_4$—NaCl Soak Test for 24 hours and 48 hours and the coating delaminated from the substrate after a 24 hour exposure (see FIG. 7). This data indicates that while the anti-reflective coating stack can be stable in corrosive conditions, the interfacial bonding with the substrate may be weak and/or the residual stress in the anti-reflective coating stack was stronger than the bonding at the substrate interface when the density of the adhesion layer and layers of the anti-reflective coating stack is too high.

Example 7

Example 7A and 7B were optical elements made using the same materials, under different processing conditions. Both Example 7A and 7B included a ZnS substrate, a silicon adhesion layer, and an anti-reflective coating stack containing layers of $SiO_2$ and Si in the following order, starting with the layer disposed directly on the silicon adhesion layer: $SiO_2$/Si/$SiO_2$/Si/$SiO_2$. Example 7A was made using an e-beam evaporation process and Example 7B was made using an ion assisted sputtering process. The e-beam evaporation process of Example 7A is a lower kinetic energy process compared to the ion assisted sputtering process of Example 7B that results in a lower density and lower compressive stress for the adhesion layer and layers of the anti-reflective coating stack. Coatings made from sputtering with a higher flux kinetic energy typically form layers having a higher density than layers formed using e-beam evaporation. FIG. 8 shows the reflectance spectra for Example 7A before and after testing with the $H_2SO_4$—NaCl Soak Test for 97 hours. FIG. 8 shows that there is little change in the transmittance through Example 7A, even after the $H_2SO_4$—NaCl Soak Test, but a wavelength shift in the reflectance spectrum was observed. The shift in the reflectance spectrum for Example 7A is indicative of a change in the refractive index of the anti-reflective coating. The reflectance spectra for Example 7B showed little change in transmittance or wavelength after testing with the $H_2SO_4$—NaCl Soak Test for 168 hours, indicating that this sample is stable in certain corrosive conditions and suggests that Example 7B would pass the $SO_2$-modified Salt Spray Test.

Example 8

Example 8A, Example 8B, and Example 8C were optical elements made using the same materials, under different processing conditions. Each of Examples 8A-C included a ZnS substrate, a silicon adhesion layer, and an anti-reflective coating stack containing layers of $SiO_2$ and Si in the following order, starting with the layer disposed directly on the silicon adhesion layer: $SiO_2$/Si/$SiO_2$/Si/$SiO_2$. Examples 8A and 8B were both made using an ion assisted sputtering process using low and high ion bombardment energy, respectively. Example 8C was made using ion bombardment energies lower than the Example 8A. The Si and $SiO_2$ layers of Example 8A were deposited at ion bombardment energies (energy consumed by the ion gun when generating the bombarding ions) of 980 Watts. The Si and $SiO_2$ layers of Example 8B were deposited at ion bombardment energies of 1338 Watts and 1340 Watts, respectively. The Si and $SiO_2$ layers of Example 8C were deposited at ion bombardment energies of 200 Watts and 300 Watts, respectively. The higher bombardment energies of Example 8B form Si and $SiO_2$ layers having a higher density and higher stress than the layers of Example 8A and 8C. Examples 8A and 8C passed the $SO_2$-modified Salt Spray Test. Example 8B failed the $SO_2$-modified Salt Spray Test and the $H_2SO_4$—NaCl Soak Test. FIG. 10 shows Examples 8A (inset A) and 8B (inset B) after 24 hours exposure to the $H_2SO_4$—NaCl Soak Test. The results show that Example 8A is clearly more resistant to corrosion than Example 8B.

The refractive index for $SiO_2$ layers deposited at high ion energies is higher than the refractive index of $SiO_2$ layers deposited at lower ion energies, indicating that the layer deposited at higher ion energies is denser. The refractive index of an $SiO_2$ layer deposited at high ion energies (1340 Watts for Example 8B) is 1.4726, as measured at 500 nm, while the refractive index of an $SiO_2$ layer deposited at low ion energies (980 Watts for Example 8A) is 1.455. The mixing law of formula (I) can be used to calculate the density of the $SiO_2$ layers in Examples 8A and 8B based on the refractive index of the layer and assuming that the $SiO_2$ material is uniformly mixed with voids/pores filled with a vacuum or gas having a refractive index of 1. The densities for the low ion energy $SiO_2$ layers of Example 8A and the high ion energy $SiO_2$ layers of Example 8B were calculated as 2.538 $g/cm^3$ and 2.636 $g/cm^3$. This data suggests that $SiO_2$ layers having a density less than 2.6 $g/cm^3$ and a refractive index less than 1.47, as measured at 550 nm, facilitate the formation of anti-reflective coating stacks that can pass the $SO_2$-modified Salt Spray Test. The measured single layer stress for the $SiO_2$ layer of Example 8A was 240 MPa.

Example 9

Example 9A and Example 9B were made using an e-beam evaporation process to deposit the Si/SiO2 layers of the anti-reflective coating stack at low density and low stress. Example 9A was a ZnS substrate having an adhesion layer of ZnSe and an anti-reflective coating stack containing layers of $SiO_2$ and Si in the following order, starting with the layer disposed directly on the ZnSe adhesion layer: Si/$SiO_2$/Si/$SiO_2$/Si/$SiO_2$. Example 9B was the same as Example 9A except that the adhesion layer contained $YbF_3$. Both Example 9A and 9B passed the $H_2SO_4$—NaCl Soak Test for 168 hours. Examples 9A and 9B indicate that depositing the layers of the anti-reflective coating stack at low stress conditions can form bonds with selenide or fluoride-based adhesion layers that are strong enough to survive certain corrosive environments. FIG. 11 illustrates the reflectance spectra for Example 9A before and testing with the $H_2SO_4$—NaCl Soak Test for 168 hours. Example 9A illustrates a shift in the reflectance spectrum after exposure to corrosive salt conditions, but the shift is small, indicating that anti-reflective coating stack is intact. In some applications, the small shift in the reflectance spectra of the anti-reflective coating stack may still be acceptable.

The following non-limiting aspects are encompassed by the present disclosure. To the extent not already described, any one of the features of the first through the forty-sixth aspect may be combined in part or in whole with features of any one or more of the other aspects of the present disclosure to form additional aspects, even if such a combination is not explicitly described.

Aspect 1 of the description is:
An optical element, comprising:
   a substrate comprising a Group VIA or fluoride-based non-oxide material;
   an adhesion layer disposed directly on the substrate, the adhesion layer comprising silicon and less than 1.0 at % oxygen; and
   an anti-reflective coating stack disposed directly on the adhesion layer and comprising a first additional layer and a second additional layer, the first additional layer comprising $SiO_x$, where 1≤x≤2, and the second additional layer comprising silicon and an oxygen content of less than 1.0 at %.

Aspect 2 of the description is:
The optical element of Aspect 1, wherein the second additional layer comprises silicon and an oxygen content of less than 0.1 at %.

Aspect 3 of the description is:
The optical element of Aspect 1 or Aspect 2, wherein the substrate comprises zinc sulfide or zinc selenide.

Aspect 4 of the description is:
The optical element of any one of Aspects 1-3, wherein the first additional layer comprising $SiO_x$ has a refractive index of less than 1.47, as measured at 550 nm, and a density of less than 2.6 g/cm$^3$.

Aspect 5 of the description is:
The optical element of any one of Aspects 1-4, wherein the adhesion layer and the anti-reflective coating stack have a total compressive stress and a total physical thickness, and wherein a stress-thickness factor obtained as a product of the total compressive stress and the total physical thickness is less than 1375 nN/nm.

Aspect 6 of the description is:
The optical element of any one of Aspects 1-5, wherein the anti-reflective coating stack comprises at least a third additional layer comprising $SiO_x$, where $1 \leq x \leq 2$, and at least a fourth additional layer comprising silicon and an oxygen content of less than 1.0 at %.

Aspect 7 of the description is:
The optical element of any one of Aspects 1-6, wherein the anti-reflective coating stack passes an $SO_2$-modified Salt Spray Test for at least 24 hours, as measured according to ASTM G85-11, Annex A4.

Aspect 8 of the description is:
The optical element of any one of Aspects 1-7, wherein the anti-reflective coating stack comprises a reflectance of 1.0% or less, as measured at at least one wavelength between 1.0 μm and 8.0 μm.

Aspect 9 of the description is:
The optical element of any one of Aspects 1-8, wherein the anti-reflective coating stack comprises a reflectance of 0.6% or less, as measured at each wavelength between 3.39 μm to 5.6 μm.

Aspect 10 of the description is:
The optical element of any one of Aspects 1-9, wherein the adhesion layer comprises silicon and an oxygen content of less than 0.1 at %.

Aspect 11 of the description is:
An optical element, comprising:
a substrate comprising a Group VIA or fluoride-based non-oxide material;
an adhesion layer disposed directly on the substrate, the adhesion layer comprising silicon and less than 1.0 at % oxygen; and
an anti-reflective coating stack disposed directly on the adhesion layer, wherein the anti-reflective coating stack passes an $SO_2$-modified Salt Spray Test for at least 24 hours, as measured according to ASTM G85-11, Annex A4.

Aspect 12 of the description is:
The optical element of Aspect 11, wherein the anti-reflective coating stack comprises:
a first reflectance, as measured at at least one wavelength between 1.0 μm to 8.0 μm; and
a second reflectance after exposure to a pH 2.5 $H_2SO_4$—NaCl solution for 72 hours, as measured at at least one wavelength between 1.0 μm to 8.0 μm, and
wherein a difference between the first reflectance and the second reflectance is less than 0.2%.

Aspect 13 of the description is:
The optical element of Aspect 11, wherein the anti-reflective coating stack comprises:
a first reflectance, as measured at each wavelength between 3.8 μm to 5.0 μm; and
a second reflectance after exposure to a pH 2.5 $H_2SO_4$—NaCl solution for 72 hours, as measured at each wavelength between 3.39 μm to 5.6 μm, and
wherein a difference between the first reflectance and the second reflectance at each wavelength between 3.39 μm to 5.6 μm is less than 0.2%.

Aspect 14 of the description is:
The optical element of any one of Aspects 11-13, wherein the anti-reflective coating stack passes an $SO_2$-modified Salt Spray Test for at least 96 hours, as measured according to ASTM G85-11, Annex A4.

Aspect 15 of the description is:
The optical element of any one of Aspects 11-14, wherein the substrate comprises zinc sulfide or zinc selenide.

Aspect 16 of the description is:
The optical element of any one of Aspects 11-15, wherein the anti-reflective coating stack comprises a first additional layer and a second additional layer, the first additional layer comprising $SiO_x$, where $1 \leq x \leq 2$, and the second additional layer comprising silicon and an oxygen content of less than 1.0 at %.

Aspect 17 of the description is:
The optical element of Aspect 16, wherein the first additional layer comprising $SiO_x$ has a refractive index of less than 1.47, as measured at 550 nm, and a density of less than 2.6 g/cm$^3$.

Aspect 18 of the description is:
The optical element of Aspect 16 or 17, wherein the second additional layer comprises silicon and an oxygen content of less than 0.1 at %.

Aspect 19 of the description is:
The optical element of any one of Aspects 11-18, wherein the adhesion layer and the anti-reflective coating stack have a total compressive stress and a total physical thickness, and wherein a stress-thickness factor obtained as a product of the total compressive stress and the total physical thickness is less than 1375 nN/nm.

Aspect 20 of the description is:
The optical element of any one of Aspects 11-19, wherein the anti-reflective coating stack comprises a reflectance of 1.0% or less, as measured at at least one wavelength between 1.0 μm to 8.0 μm.

Aspect 21 of the description is:
The optical element of any one of Aspects 11-20, wherein the anti-reflective coating stack comprises a reflectance of 0.6% or less, as measured at each wavelength between 3.39 μm to 5.6 μm.

Aspect 22 of the description is:
The optical element of any one of Aspects 11-21, wherein the adhesion layer comprises silicon and an oxygen content of less than 0.1 at %.

Aspect 23 of the description is:
An optical element, comprising:
a substrate comprising a Group VIA or fluoride-based non-oxide material;
an adhesion layer disposed directly on the substrate; and
an anti-reflective coating stack disposed directly on the adhesion layer and comprising a first additional layer and a second additional layer, the first additional layer comprising $SiO_x$, where $1 \leq x \leq 2$, and the second additional layer comprising silicon and an oxygen content of less than 1.0 at %, and wherein the anti-reflective coating stack passes an $SO_2$-modified Salt Spray Test for at least 24 hours, as measured according to ASTM G85-11, Annex A4.

Aspect 24 of the description is:
The optical element of 23, wherein the anti-reflective coating passes an $SO_2$-modified Salt Spray Test for at least 96 hours, as measured according to ASTM G85-11, Annex A4.

Aspect 25 of the description is:
The optical element of Aspect 23 or Aspect 24, wherein the substrate comprises zinc sulfide or zinc selenide.

Aspect 26 of the description is:
The optical element of any one of Aspects 23-25, wherein the anti-reflective coating stack comprises at least a third additional layer comprising $SiO_x$, where $1 \leq x \leq 2$, and at least a fourth additional layer comprising silicon and an oxygen content of less than 1.0 at %.

Aspect 27 of the description is:
The optical element any one of Aspects 23-26, wherein the first additional layer comprising $SiO_x$ has a refractive index of less than 1.47, as measured at 550 nm, and a density of less than 2.6 g/cm³.

Aspect 28 of the description is:
The optical element of any one of Aspects 23-27, wherein the adhesion layer and the anti-reflective coating stack have a total compressive stress and a total physical thickness, and wherein a stress-thickness factor obtained as a product of the total compressive stress and the total physical thickness is less than 1375 nN/nm.

Aspect 29 of the description is:
The optical element of any one of Aspects 23-28, wherein the second additional layer comprises silicon and an oxygen content of less than 0.1 at %.

Aspect 30 of the description is:
The optical element of any one of Aspects 23-29, wherein the anti-reflective coating stack comprises a reflectance of 1.0% or less, as measured at at least one wavelength between 1.0 μm and 8.0 μm.

Aspect 31 of the description is:
The optical element of any one of Aspects 23-30, wherein the anti-reflective coating stack comprises a reflectance of 0.6% or less, as measured at each wavelength between 3.39 μm to 5.6 μm.

Aspect 32 of the description is:
An optical element, comprising:
    a substrate comprising a Group VIA or fluoride-based non-oxide material;
    an adhesion layer disposed on the substrate; and
    an anti-reflective coating stack disposed on the adhesion layer, wherein the anti-reflective coating stack has a reflectance of 1.0% or less, as measured at at least one wavelength between 1.0 μm to 8.0 μm, and
    wherein the anti-reflective coating stack passes an $SO_2$-modified Salt Spray Test for at least 24 hours, as measured according to ASTM G85-11, Annex A4.

Aspect 33 of the description is:
The optical element of 32, wherein the anti-reflective coating stack has a reflectance of 0.6% or less, as measured at at least one wavelength between 1.0 μm to 8.0 μm.

Aspect 34 of the description is:
The optical element of 32 or Aspect 33, wherein the anti-reflective coating stack passes an $SO_2$-modified Salt Spray Test for at least 96 hours, as measured according to ASTM G85-11, Annex A4.

Aspect 35 of the description is:
The optical element of any one of Aspects 32-34, wherein the substrate comprises zinc sulfide or zinc selenide.

Aspect 36 of the description is:
The optical element of any one of Aspects 32-35, wherein the anti-reflective coating stack comprises a first additional layer and a second additional layer, the first additional layer comprising $SiO_x$, where $1 \leq x \leq 2$, and the second additional layer comprising silicon and an oxygen content of less than 1.0 at %.

Aspect 37 of the description is:
The optical element of Aspect 36, wherein the first additional layer comprising $SiO_x$ has a refractive index of less than 1.47, as measured at 550 nm, and a density of less than 2.6 g/cm³.

Aspect 38 of the description is:
The optical element of any one of Aspects 32-37, wherein the adhesion layer and the anti-reflective coating stack have a total compressive stress and a total physical thickness, and wherein a stress-thickness factor obtained as a product of the total compressive stress and the total physical thickness is less than 1375 pN/nm.

Aspect 39 of the description is:
The optical element of any one of Aspects 32-38, wherein the anti-reflective coating stack comprises a reflectance of 1.0% or less, as measured at at least one wavelength between 1.0 μm to 8.0 μm.

Aspect 40 of the description is:
The optical element of any one of Aspects 32-39, wherein the anti-reflective coating stack comprises a reflectance of 0.6% or less, as measured at each wavelength between 3.39 μm to 5.6 μm.

Aspect 41 of the description is:
A method of forming an optical element, the method comprising:
    providing a substrate comprising a Group VIA or fluoride non-oxide material;
    ion bombarding a first surface of the substrate for at least 3 minutes, wherein a power applied to the ion source is at least 100 Watts;
    depositing an adhesion layer directly on the first surface, wherein the adhesion layer comprises silicon and less than 1.0 at % oxygen; and
    depositing an anti-reflective coating stack directly on the adhesion layer.

Aspect 42 of the description is:
The method of Aspect 41, wherein the step of depositing an anti-reflective coating stack comprises:
    depositing a first additional layer of $SiO_x$, where $1 \leq x \leq 2$, on the adhesion layer;
    depositing a second additional layer on the first additional layer of $SiO_x$, the second additional layer comprising silicon and less than 1.0 at % oxygen;
    repeating the step of depositing a first additional layer of $SiO_x$ at least one time; and
    repeating the step of depositing a second additional layer at least one time.

Aspect 43 of the description is:
The method of Aspect 41 or 42, wherein the step of ion bombarding comprises ion bombarding the first surface with Argon gas ions.

Aspect 44 of the description is:
The method of any one of Aspects 41-43, wherein the step of ion bombarding comprises applying a power of at least 300 Watts to the ion source.

Aspect 45 of the description is:
The method of any one of Aspects 41-44, wherein the step of ion bombarding comprises ion bombarding the first surface for at least 30 minutes.

Aspect 46 of the description is:

The method of any one of Aspects 41-45, wherein the substrate comprises zinc sulfide or zinc selenide.

Many variations and modifications may be made to the above-described embodiments of the disclosure without departing substantially from the spirit and various principles of the disclosure. All such modifications and variations are intended to be included herein within the scope of this disclosure and protected by the following claims.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed.

What is claimed is:

1. An optical element, comprising:
    a substrate comprising a Group VIA or fluoride-based non-oxide material;
    an adhesion layer disposed directly on the substrate, the adhesion layer comprising silicon and less than 1.0 at % oxygen; and
    an anti-reflective coating stack disposed directly on the adhesion layer and comprising a first additional layer and a second additional layer, the first additional layer comprising $SiO_x$, where $1 \leq x \leq 2$, and the second additional layer comprising silicon and an oxygen content of less than 1.0 at %, the first additional layer comprising $SiO_x$ having a refractive index of less than 1.47, as measured at 550 nm, and a density of less than 2.6 g/cm$^3$.

2. The optical element of claim 1, wherein the second additional layer comprises silicon and an oxygen content of less than 0.1 at %.

3. The optical element of claim 1, wherein the substrate comprises zinc sulfide or zinc selenide.

4. The optical element of claim 1, wherein the adhesion layer and the anti-reflective coating stack have a total compressive stress and a total physical thickness, and wherein a stress-thickness factor obtained as a product of the total compressive stress and the total physical thickness is less than 1375 nN/nm.

5. The optical element of claim 1, wherein the anti-reflective coating stack comprises at least a third additional layer comprising $SiO_x$, where $1 \leq x \leq 2$, and at least a fourth additional layer comprising silicon and an oxygen content of less than 1.0 at %.

6. The optical element of claim 1, wherein the anti-reflective coating stack passes an $SO_2$-modified Salt Spray Test for at least 24 hours, as measured according to ASTM G85-11, Annex A4.

7. The optical element of claim 1, wherein the anti-reflective coating stack comprises a reflectance of 0.6% or less, as measured at each wavelength between 3.39 μm to 5.6 μm.

8. An optical element, comprising:
    a substrate comprising a Group VIA or fluoride-based non-oxide material;
    an adhesion layer disposed directly on the substrate, the adhesion layer comprising silicon and less than 1.0 at % oxygen; and
    an anti-reflective coating stack disposed directly on the adhesion layer, wherein the anti-reflective coating stack passes an $SO_2$-modified Salt Spray Test for at least 24 hours, as measured according to ASTM G85-11, Annex A4.

9. The optical element of claim 8, wherein the anti-reflective coating stack comprises:
    a first reflectance, as measured at at least one wavelength between 1.0 μm to 8.0 μm; and
    a second reflectance after exposure to a pH 2.5 $H_2SO_4$—NaCl solution for 72 hours, as measured at at least one wavelength between 1.0 μm to 8.0 μm, and
    wherein a difference between the first reflectance and the second reflectance is less than 0.2%.

10. The optical element of claim 8, wherein the anti-reflective coating stack comprises:
    a first reflectance, as measured at each wavelength between 3.8 μm to 5.0 μm; and
    a second reflectance after exposure to a pH 2.5 $H_2SO_4$—NaCl solution for 72 hours, as measured at each wavelength between 3.39 μm to 5.6 μm, and
    wherein a difference between the first reflectance and the second reflectance at each wavelength between 3.39 μm to 5.6 μm is less than 0.2%.

11. The optical element of claim 8, wherein the anti-reflective coating stack passes an $SO_2$-modified Salt Spray Test for at least 96 hours, as measured according to ASTM G85-11, Annex A4.

12. The optical element of claim 8, wherein the substrate comprises zinc sulfide or zinc selenide.

13. The optical element of claim 10, wherein the adhesion layer comprises silicon and an oxygen content of less than 0.1 at %.

14. An optical element, comprising:
    a substrate comprising a Group VIA or fluoride-based non-oxide material;
    an adhesion layer disposed directly on the substrate; and
    an anti-reflective coating stack disposed directly on the adhesion layer and comprising a first additional layer and a second additional layer, the first additional layer comprising $SiO_x$, where $1 \leq x \leq 2$, and the second additional layer comprising silicon and an oxygen content of less than 1.0 at %, and
    wherein the anti-reflective coating stack passes an $SO_2$-modified Salt Spray Test for at least 24 hours, as measured according to ASTM G85-11, Annex A4.

15. The optical element of claim 14, wherein the substrate comprises zinc sulfide or zinc selenide.

16. The optical element of claim 14, wherein the anti-reflective coating stack comprises at least a third additional layer comprising $SiO_x$, where $1 \leq x \leq 2$, and at least a fourth additional layer comprising silicon and an oxygen content of less than 1.0 at %.

17. The optical element of claim 14, wherein the first additional layer comprising $SiO_x$ has a refractive index of less than 1.47, as measured at 550 nm, and a density of less than 2.6 g/cm$^3$.

18. The optical element of claim 14, wherein the second additional layer comprises silicon and an oxygen content of less than 0.1 at %.

19. The optical element of claim 14, wherein the anti-reflective coating stack comprises a reflectance of 1.0% or less, as measured at at least one wavelength between 1.0 μm and 8.0 μm.

* * * * *